R. G. WESTON.
HORN SHAPING DEVICE.
APPLICATION FILED JUNE 12, 1919.

1,334,200.   Patented Mar. 16, 1920.

Inventor
R. G. Weston,
By Mason Fenwick & Lawrence,
Attorneys

UNITED STATES PATENT OFFICE.

REGINALD G. WESTON, OF DENVER, COLORADO.

HORN-SHAPING DEVICE.

1,334,200.      Specification of Letters Patent.      Patented Mar. 16, 1920.

Application filed June 12, 1919. Serial No. 303,774.

*To all whom it may concern:*

Be it known that I, REGINALD G. WESTON, a citizen of the United States, residing at Denver, in the county of Denver and State of Colorado, have invented certain new and useful Improvements in Horn-Shaping Devices; and I do hereby declare the following to be a full, clear, and exact description of the invention, such as will enable others skilled in the art to which it appertains to make and use the same.

This invention relates to horn shaping devices and particularly to improvements in means for fastening the devices to horns.

It is an object of the present invention to improve the fastening means for attaching and holding horn shaping weights to cattle horns and to accomplish this in the most inexpensive and practicable manner to secure the most efficacious results.

With the above and other objects in view as will be manifest to those versed in the art, the invention consists of the construction, and, in details, and arrangements of the parts as more particularly described in the following specification relative to the embodiment of the invention shown in the accompanying drawing, in which.

In the preferred form of my invention a weight comprising a substantially pear shaped block 2, is utilized. The blocks are of course made in different sizes according to the size of the horns upon which they are employed. To secure the effectual attachment of the weight to the horn I have found that by providing the conical, longitudinally disposed aperture 3 with peculiar thread like corrugations, the weight can be readily attached to the horns which not only vary in size, but also are irregular in shape.

Figure 1:
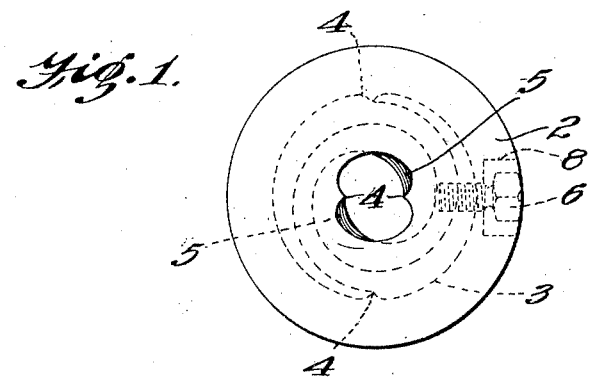
Figure 1 is the top plan view of the weight.
Figure 2:
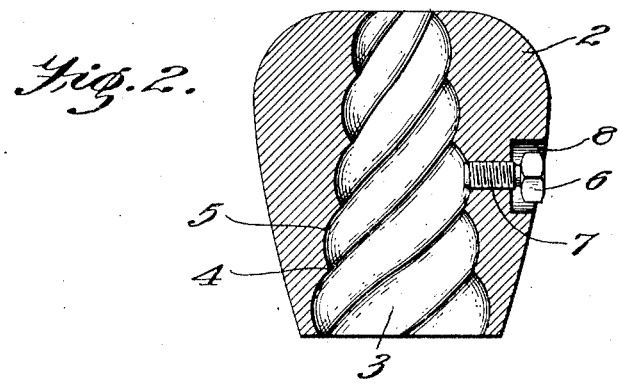
Fig. 2 is the central longitudinal sectional view of the weight.

I prefer that the corrugations be in the form of shallow threads of helical form and long pitch. The threads as shown have angular ridges 4, with shallow and concave curved channels in between at 5. Preferably I employ multiple threads as shown clearly in Fig. 1, so that the threads will engage and grip the horn, when turned in a half rotation about the horn.

Further means for securing the weight in place consist in using the set-screw 6, engaging a threaded hole 7; the head of the screw being concealed in a countersink 8, so as to be prevented from being entangled with any obstacles when applied to a horn.

What I claim is:

1. A horn shaping weight of pear-shaped form and having a conical horn-receiving aperture extending longitudinally and converging from the smaller end of the weight, one side of the latter having a threaded aperture for a set screw and a countersink at the outer end thereof in which the head of the screw will be substantially concealed when applied.

2. A horn shaping weight of pear shaped form and having a conical horn-receiving aperture extending longitudinally and converging from the smaller end thereof, the walls of the aperture provided with shallow, long-pitch threads to readily take to the surface of a horn.

3. A horn shaping weight of pear shaped form and having a conical horn-receiving aperture extending longitudinally and converging from the smaller end thereof, the walls of the aperture provided with shallow, long-pitch multiple threads to readily take to the surface of a horn.

4. A horn shaping weight of pear shaped form and having a conical horn-receiving aperture extending longitudinally and converging from the smaller end thereof, the wall of the aperture provided with shallow, long-pitch threads to readily take to the surface of a horn, the threads having angular ridge lines and curved channels between the ridges.

In testimony whereof I affix my signature.

REGINALD G. WESTON.